United States Patent Office 3,556,923
Patented Jan. 19, 1971

3,556,923
POLYVINYL FLUORIDE FILM
Jacob David Polejes, Wilmington, Del., assignor to E. I. du Pont de Nemours and Company, Wilmington, Del., a corporation of Delaware
No Drawing. Continuation of application Ser. No. 433,499, Feb. 17, 1965. This application Oct. 1, 1968, Ser. No. 764,344
Int. Cl. C08f 45/08; B32b 27/18, 27/30
U.S. Cl. 161—162      8 Claims

ABSTRACT OF THE DISCLOSURE

A polyvinyl fluoride film containing from about 0.5% to 60% by weight, based on the total weight of the film, of an opacifying coloration pigment and from about 2% to 10% by weight, based on the total weight of the film, of inert particulate material of silica having an average particle diameter within the range of 2 to 10 microns and an effective length within the range of 10 to 50 microns, the polyvinyl fluoride film exhibiting an 85° Gardner gloss rating no greater than 20.

---

This is a continuation of my copending application Ser. No. 433,499, filed Feb. 17, 1965, now abandoned.

This invention relates to polyvinyl fluoride films and, more particularly, to opaque low-gloss polyvinyl fluoride films.

Polyvinyl fluoride, in film form, possesses a mutual combination of excellent resistance to outdoor weathering exposures, a high degree of physical toughness, chemical inertness, abrasion resistance, resistance to soiling and the action of solvents, as well as an amazing retention of these properties at both low and elevated temperatures. The above combinations of properties not only strongly suggest many areas of use of polyvinyl fluoride film in the form of self-supporting films, but also in the use of such films as outer layers of a wide variety of laminar structures designed chiefly for outdoor use wherein polyvinyl fluoride films serve to upgrade less functional substrates, according to the final structure a degree of utility not to be found solely in either film or substrate.

Whether employed as self-supporting films or as film components of laminar structures to be employed with pre-finished building siding and roofing, and domestic, commercial and industrial installations, the polyvinyl fluoride film logically serves as a means for imparting to the structure both opacity and coloration effects, which may be desirable for both aesthetic and functional reasons. In keeping with modern architectural trends requiring decorative, functional structures, with a minimum of reflective glare, pigmented polyvinyl fluoride films exhibiting low specular gloss are in demand. Pigmented polyvinyl fluoride films, however, normally tend to exhibit a rather high specular gloss, hypical films ranging in Garner gloss ratings from 65 to 9° at 85°. While mechanical scuffing or embossing might serve to reduce the gloss of pigmented polyvinyl fluoride films, such films would only serve effectively in self-supporting applications inasmuch as the effect of such gloss reducing expedience is all but erased by the combined effect of heat and pressure employed in most laminating techniques.

Thus, it is necessary to provide a colored opaque polyvinyl fluoride film characterized by a low gloss which is not substantialy effected by conventional laminating techniques customarily employed in fabricating laminar structures surfaced with a film. Further, the colored, opaque polyvinyl fluoride film characterized by the low gloss normally employing a deglossing agent must be essentially chemically inert to the adhesive or laminar systems commonly used in laminating procedures.

It is, therefore, an object of the present invention to provide an opaque polyvinyl fluoride film having low gloss.

It is a further object of this invention to provide an opaque polyvinyl fluoride film having low gloss which is chemically inert to the adhesive or laminar systems used in laminating procedures. These and other objects will appear hereinafter.

These and other objects of this invention are accomplished by a polyvinyl fluoride film containing from about 0.5% to 60%, preferably 1% to 35% by weight, based on the total weight of the film, of an opacifying coloration pigment and from about 2% to 10%, preferably 5% to 9%, by weight, based on the total weight of the film, of inert particulate silica, having an average particle diameter within the range of 2 to 10 microns and an effective length within the range of 10 to 50 microns, the polyvinyl fluoride film exhibiting an 85° Gardner gloss rating no greater than 20.

The pigmented polyvinyl fluoride films of this invention can be formed by procedures and initial materials and solvents such as those described in U.S. Pat. 2,953,818 combined with the procedures of U.S. Pat. 3,139,470. One method of forming such films comprises feeding a mixture of latent solvent, pigment, inorganic particulate material and particulate polyvinyl fluoride to a heated extruder which is connected to a slotted casting hopper. A tough, coalesced extrudate of polyvinyl fluoride is continuously extruded in the form of sheet or film containing latent solvent. This sheet or film is then preferably heated or stretched in one or more directions while solvent is volatilized therefrom. A thermal stabilizer such as a mixture of glycidyl polyether and triphenyl phosphate can be incorporated in the mixed feed through the extruder up to 2% by weight, based on the weight of total solids, such as described in U.S. application Ser. No. 345,123, filed Feb. 17, 1964 and now abandoned, assigned to the assignee of the present application. However, any effective, commercially available stabilizer sold for the thermal stabilization of vinyl fluoride can be employed.

While any convenient technique can be employed in preparing the mixtures being fed to the extruder, a typical preparation which insures the delivery of a mix having a high degree of homogeneity is as follows: initially, all the particulate polyvinyl fluoride which is to be present in the mixture fed to the extruders is dispersed in a sufficient quantity of latent solvent to provide a fluid, homogeneous dispersion which is passed through a 50 mesh screen (National Bureau of Standards) and delivered into a blend tank. Next, all of the opacifying coloration pigment is dispersed in an additional portion of the latent solvent until a rather concentrated but fluid homogeneous dispersion is obtained which is passed through 325 mesh screen (NBS) and delivered into the same tank. Next, the inert particulate silica is dispersed in an additional quantity of latent solvent and delivered to the same blend tank. At this point up to 2% by weight of the thermal stabilizer, based on the total solids in the tank, can be added. Additional latent solvent is added at this time to bring the solid content of the mix in the blend tank up to 55-65% of the total weight, preferably 58-62%. While the contents of the blend tank are continuously and slowly mixed to maintain homogeneity, the mixture is pumped to the extruder.

Vinyl fluoride polymer employed in the film of this invention, in addition to homopolymers of vinyl fluoride, includes copolymers of vinyl fluoride with other monoethylenically unsaturated monomers copolymerizable therewith, wherein the vinyl fluoride is present in substantial or major amounts, i.e., at least 75% to 80% of the total by weight. Examples are mono-ethylenic hydrocarbons, e.g., ethylene, propylene, isobutylene and styrene; halogen-substituted mono-ethylenic hydrocarbons, e.g., vinyl chloride, vinyl bromide, 1,1-dichloroethylene, 1,1-difluoroethylene, difluorochloroethylene, trifluorochloroethylene, tetrafluoroethylene, trifluoropropylene, difluoroisobutylene; vinyl esters, e.g., vinyl formate, vinyl acetate, vinyl propionate, vinyl butyrate, vinyl benzoate, vinyl pivalate, vinyl stearate and vinyl esters of inorganic acids; vinyl ethers, e.g., vinyl ethyl ether, tetrafluoroethylallyl ether and vinyl dioxolane; vinyl ketones, e.g., methyl vinyl ketone; N-vinyl imides, e.g., N-vinyl succinimide and N-vinyl phthalimide; acrylic and methacrylic acids and their derivatives, e.g., esters, amides, and hydrides and acid halides, including methyl methacrylate, beta hydroxyethyl methacrylate, allyl methacrylate, N-butyl methacrylamide, etc.; derivatives of maleic and fumaric acids, e.g. diethyl maleate and dimethylfumarate; propenyl esters, e.g., allyl acetate, isopropenyl acetate, etc. Similarly, vinylidene fluoride and copolymers thereof, as well as fluorocarbon polymers generally, can be employed.

From the standpoint of producing a film with optimum property levels, it is preferred to employ a film made from orientable polyvinyl fluoride of as high a molecular weight as possible. Films made from polymer ranging in inherent viscosity as measured at 30° C. in a solution of hexamethylphosphoramide having a polymer concentration of 0.05 g./100 ml. from approximately 0.5 up to greater than 5.0 have been successfully employed. However, polymer ranging in inherent viscosity from 1.0 to 3.5 provides the optimum balance between property levels of finished film and process economies.

To keep the pigment loading level in the film below that above which certain important physical properties of the film begin to decline and yet simultaneously provide sufficient hiding power for thin polyvinyl fluoride films, the opacifying coloration pigments used in the preparation of films of this invention are employed in as finely comminuted a state as can conveniently be obtained without serious economic penalty. A greater portion of the particles of the pigment components employed should have an average diameter in the sub-micron range where a high level of coloration and opacification is accomplished at permissible pigment loading levels. It has been found that the pigment level can be as much as 60%; however, it is preferred that the film contain about 1% to 35% pigment.

Although the pigments employed in the polyvinyl fluoride films in this invention are termed "opacifying," it should be understood that the films of this invention need not be opaque in the sense that they totally obstruct the passage of light. With lower pigment loading levels, e.g., as little as 1% of the total weight, especially with the thinner films, highly decorative effects are realized with varying degrees of low glare translucency. Any coloration pigment or combination of coloration pigments, including whites and blacks as well as true spectral colors between these extremes can be employed for purpose of this invention. A preferred pigment is rutile titania, either white or colored; however, other opacifying pigments are basic zinc chromate, oxide of iron, phthalocyanine greens and blues, chrome green or yellow, cadmium selenide red, lampblack or the "monastral" colors, etc.

Most of the pigmented polyvinyl fluoride in this invention will be employed outdoors in laminar constructions where they will be combined with substrates such as aluminum, cold rolled steel, galvanized aluminized steels, plywood, grainless-cement boards, asphalt-impregnated cellulosic boards and other plastic materials including in situ-cured, reinforced polyester structures. Therefore, the preservation of the highly durable interfacial bond between the polyvinyl fluoride film and the substrate during long term hydrolytic attack consequent with outdoor exposure is essential. Thus, it has been found that an inert particulate material of a certain particle size has been an acceptable deglossing agent while being chemically inert to subsequent adhesive or laminar systems used in laminating procedures.

Inert particulate silica ranging from 2 to 10 microns in average particle diameter and 10 to 50 microns in length is employed in preparation of the polyvinyl fluoride films of this invention. This range of particle sizes has been useful for obtaining the greatest reduction in gloss at loadings that cause no serious decline in important physical properties of the film. The particulate silica within the broad particle size range specified can be employed in the preparation of low gloss pigmented polyvinyl fluoride films of this invention. This particulate silica present in the mixtures fed to the extruder to the extent that it constitutes from 2% to 10% by weight of the final film, based on the total weight thereof, preferably between 5 and 9% by weight of the final film. Below the 2% level, Gardner gloss ratings of 20 or less at 85° are not generally obtained. At much above the 10% level, it becomes increasingly difficult to extrude polyvinyl fluoride from feed mixes containing sufficient pigments to provide functional opacity and films as thin as one mil.

The preferred inert particulate matter for use in this invention is silica such as diatomaceous earths, in particular, acicular, modular, lamella and irregular shapes having the required particle dimensions. "Celite," super floss diatomaceous earth, manufactured by Johns-Manville Products Corporation, is a particularly preferred material which is approximately 90% amorphous silica that has been flux-calcined in the presence of soda ash. The particulate silica, 46% of which is coarser than 2 to 4 microns, has a length up to about 50 microns.

Polyvinyl fluoride films can be laminated to substrates. Examples of substrates are metal substrates such as cold rolled steel, iron, galvanized iron and steel, aluminum, aluminized steel, chromium, bronze, brass, lead, tin and nickel and various other alloys; glass and other vitreous substrates such as those of porcelain and china; impregnated substrates such as asphalt-impregnated cellulosics; hardboards such as "Masonite"; cement-asbestos boards; wood substrates such as those of birch, oak, fir, pine, hemlock, cedar, redwood, poplar, and ash as well as the plywoods for use as siding and/or roofing for houses and other domestic structures as well as for commercial, industrial and institutional buildings; and polymeric substrates such as those of homopolymers of vinyl chloride and copolymers thereof with, for example, vinylidene chloride, vinyl acetate and fumaric, maleic and acrylic esters, those of regenerated cellulose, those of acrylic esters, those of urea-, melamine- or phenol-formaldehyde resins, and those of vinyl acetates. Laminations to metal and wooden substrates can be employed in the manufacture of outdoor signs, wall tile, wall and ceiling paneling, Venetian blinds, interior partitioning, awnings, ductwork, counter- and table-tops, store fronts, rain gutters and downspouts. Laminations to metal, particularly of pigmented polyvinyl fluoride films, can be postformed and employed to replace enameled and baked wall, ceiling, floor and side members of applications such as refrigerators, freezers, air conditioners, dehumidifiers, hot-water heaters, washers and dryers, kitchen cupboards and cabinets. In the automotive field, laminations of metallized and pigmented polyvinyl fluoride films to metal substrates can be employed variously as automobile door and side paneling, hard tops, moldings, interior and exterior trim, instrument paneling, wheel covers and hub caps, siding and tops for house trailers and truck and van bodies. Prior to lamination, metallic substrates can and usually are given a conventional passivation or corrosion-inhibiting treatment such as that used commercially to prepare substrates for painting. Laminated to coated or uncoated fabrics or to polymeric films, polyvinyl fluoride films can serve as headliners, seat covers, floor mats and trunk liners. Other uses for the laminates of this invention include upholstery, floor coverings, lamp shades and book bindings. Of course, a second layer of polyvinyl fluoride film can also be used as substrates. Any satisfactory adhesive may be employed in preparing the laminates:

The vinyl addition polymer adhesive and its mixtures with the epoxy compounds and the preparation of each are fully described, respectively, in pending U.S. patent applications Ser. No. 218,102, now U.S. Pat. 3,228,823, by H. R. Usala and L. E. Wolinski and Ser. No. 218,103 by H. R. Usala, both filed Aug. 20, 1962, and Ser. No. 415,200 by L. E. Wolinski, filed Dec. 1, 1964, now U.S. Pat. 3,399,248, and all are assigned to the same assignee as that of the present invention.

Illustrative of polyester-based adhesives are those polyester and copolyester compositions disclosed in Snyder, U.S. Pat. 2,623,033; Alles and Saner, U.S. Pat. 2,968,239; Saner, U.S. Pat. 2,698,241; and Williams, U.S. Pat. 2,765,251. Such compositions are usually obtained by reacting a slight stoichiometric excess of ethylene glycol with dimethyl esters of terephthalic, sebacic, isophthalic and/or adipic acids.

Illustrative of acrylic adhesives are those disclosed in Heher and Bauer, U.S. Pat. 2,464,826, and Blake, U.S. Pat. 2,949,445, as well as Belgian Pat. 610,317.

Illustrative modified adhesives are those disclosed in pending U.S. application Ser. No. 379,382 by L. E. Wolinski, filed June 30, 1964, now abandoned, and assigned to the assignee of the present invention.

Ultraviolet light absorber compounds can be used and illustrative examples are disclosed and the preparation of each fully described respectively for:

(1) 4 or 4'-acrylic esters of 2-hydroxybenzo- and acetophenones in pending U.S. patent application Ser. No. 179,766, filed Mar. 14, 1962, now U.S. Pat. 3,265,760;

(2) Poly(2-hydroxyaryl) ketones in pending U.S. patent application Ser. No. 378,428, filed June 26, 1964, now U.S. Pat. 3,324,799.

(3) Polymers of aldehydes/2-hydroxybenzophenone in pending U.S. application Ser. No. 376,573, filed June 19, 1964, now U.S. Pat. 3,330,884;

(4) Polymers of 4,4'-epoxyalkoxy 2-hydroxybenzophenone in pending U.S. patent application Ser. No. 368,316, filed May 18, 1964, now abandoned;

(5) Polymers of acrylic esters of salicylolbenzoylmethane in pending U.S. patent application Ser. No. 54,824, filed Sept. 9, 1960, now U.S. Pat. 3,175,024, all by S. Tocker and all assigned to the same assignee as that of the present invention.

Additional illustrative ultraviolet light absorber compounds are:

(1) Polymers of acrylic esters of salicylates in Tocker, U.S. Pat. No. 3,113,907;

(2) Polymers of 2'-acrylic esters of 2-hydroxybenzophenone in Tocker, U.S. Pat. 3,133,042, and commercially available products such as "Cyasorb" UV9, "Cyasorb" UV24, manufactured by American Cyanamid, "Uvinul's" 400, 490, D–49, D–50 and M–40, manufactured by General Aniline & Film Corp.

The invention can be further understood by the following example:

EXAMPLE 1

A blend tank is charged with 60 pounds of N,N-dimethylacetamide, 29 pounds particulate polyvinyl fluoride, 8 pounds of rutile titania, 0.5 pound of a thermal stabilizer glycidyl polyether (Epon 1004/triphenyl phosphate [4/1 ratio]) and 2.7 pounds of particulate silica comprising chiefly particles ranging from 2 to 10 microns in average diameter and wherein the greater portion of the particles range in average diameters from 3 to 6 microns and having a particle length of 10 to 50 microns. This mixture is continuously pumped to a heated extruder connected to a slotted casting hopper 27 inches long with an average lip spacing of 25 mils, from which issued (at about 155° C.) a coalesced latent solvent containing polyvinyl fluoride film which is immediately cooled by conducting it through a water quench bath maintained at about 15° C. Casting drawdown is adjusted so that the quenched film averaged about 18 mils of thickness. This latent solvent containing film is then continuously stretched first longitudinally 2× at 80° C. and then transversely 2.7× at a temperature in the range of 120° C. to 140° C. followed by drying, that is, the volatilization of the remaining dimethylacetamide by exposure for about 30 seconds to an ambient temperature in the range of 180° C. to 190° C. The resulting 2 mil thick polyvinyl fluoride film exhibited a Gardner gloss rating of 11 at 85°.

A control film is prepared in the same manner as the film of Example 1 except the feed mixture contained 32 pounds of polyvinyl fluoride and did not contain any particulate silica. The resulting 2 mil thick control film exhibited a Gardner gloss rating of 94 at 85°.

A similar control film is prepared in the same manner; however, as a deglossing agent, 7% by weight of calcium carbonate having an average particle diameter range of 2 to 10 microns with maximum particle diameter up to 13 microns is used. The resulting 2 mil thick film exhibited a Gardner gloss rating of 24 at 85°. $CaCO_3$ has the right particle diameter but not the right particle length; therefore, results are not in scope of the invention.

Gardner gloss ratings of the film samples are measured in accordance with attendant method of test for specular gloss, ASTM designation D523–53T, without applying the diffusion correction (see Section 8 of Method of Test). The apparatus employed for carrying out these measurements is a Model AU–10A gloss meter for an automatic photometric unit, in combination with Model UX–5 85° gloss head manufactured by Henry A. Gardner Laboratory Corp. Bethesda, Md. Film samples are mounted on a flat stage and the gloss head is placed on the samples so that the incident light beam is aimed in the machine direction of the samples, i.e., the direction which the film passes through the film manufacturing apparatus.

I claim:

1. A polyvinyl fluoride film containing from about 0.5% to 60% by weight, based on the total weight of the film, of an apacifying coloration pigment and from about 2% to 10% by weight, based on the total weight of the film, of inert particulate material of silica having an average particle diameter within the range of 2 to 10 microns and an effective length within the range of 10 to 50 microns, the polyvinyl fluoride film exhibiting an 85° Gardner gloss rating no greater than 20.

2. The polyvinyl fluoride film of claim 1 wherein the polyvinyl fluoride film contains from 1% to 35% by weight, based on the weight of the film, of the opacifying coloration pigment.

3. The polyvinyl fluoride film of claim 1 wherein the polyvinyl fluoride film contains from .5% to 9% by weight, based on the weight of the film, of the inert particulate material.

4. The polyvinyl fluoride film of claim 1 wherein the opacifying coloration pigment is rutile titania.

5. The polyvinyl fluoride film of claim 1 additionally containing an ultraviolet light absorbing compound.

6. The polyvinyl fluoride film of claim 1 wherein said film is biaxially oriented.

7. A laminated structure comprising a substrate laminated to a polyvinyl fluoride film containing from about 1% to 35% by weight, based on the total weight of the film, of an opacifying coloration pigment and from about 5% to 9% by weight, based on the total weight of the film, of inert particulate silica having an average particle diameter with the range of 2 to 10 microns, the effective length within the range of 10 to 50 microns, the polyvinyl fluoride film exhibiting an 85° Gardner gloss rating no greater than 20.

8. The laminated structure of claim 7 wherein said substrate is plywood.

References Cited

UNITED STATES PATENTS 3,154,461  10/1964  Johnson _____ 161—116
3,326,739  6/1967  Brennan et al. _____ 161—168

OTHER REFERENCES

J. J. Mattiello: "Protective and Decorative Coatings," 1943, John Wiley & Sons Inc., New York, vol. II, pp. 164, 476 and 478.

Henry Fleming Payne: "Organic Coating Technology," 1961, John Wiley & Sons Inc., New York, vol. II, pp. 786–788.

ALLAN LIEBERMAN, Primary Examiner
J. H. DERRINGTON, Assistant Examiner

U.S. Cl. X.R.

161—165, 189, 206, 402; 260—41

PO-1050
(5/69)

UNITED STATES PATENT OFFICE
CERTIFICATE OF CORRECTION

Patent No. 3,556,923          Dated January 19, 1971

Inventor(s) Jacob David Polejes

It is certified that error appears in the above-identified patent and that said Letters Patent are hereby corrected as shown below:

Column 1, line 61, "9°" should read -- 95 --.

Column 5, line 19, "2,968-" should read -- 2,698-

Column 6, line 48 (Claim 1), "apacifying" should read -- opacifying --.

Column 7, line 1 (Claim 7), "with" should read -- within --.

Column 7, line 1 (Claim 7), "the" (second occurrence) should read -- and an --.

Signed and sealed this 18th day of May 1971.

(SEAL)
Attest:

EDWARD M. FLETCHER, JR..         WILLIAM E. SCHUYLER, JR
Attesting Officer                Commissioner of Patents